US011953931B2

(12) United States Patent
Vanek et al.

(10) Patent No.: US 11,953,931 B2
(45) Date of Patent: Apr. 9, 2024

(54) PEDAL ASSEMBLY HAVING FORCE SENSING

(71) Applicant: KSR IP Holdings, LLC, Wilmington, DE (US)

(72) Inventors: Marty Vanek, Thamesville (CA); James Hartford, Bleinheim (CA)

(73) Assignee: KSR IP Holdings, LLC, Wilmington, DE (US)

(\*) Notice: Subject to any disclaimer, the term of this patent is extended or adjusted under 35 U.S.C. 154(b) by 0 days.

(21) Appl. No.: 18/107,716

(22) Filed: Feb. 9, 2023

(65) Prior Publication Data

US 2023/0259150 A1 Aug. 17, 2023

Related U.S. Application Data

(60) Provisional application No. 63/309,817, filed on Feb. 14, 2022.

(51) Int. Cl.
  *G05G 1/38* (2008.04)
  *G01D 5/14* (2006.01)
  (Continued)

(52) U.S. Cl.
  CPC .................. *G05G 1/38* (2013.01); *G01D 5/14* (2013.01); *G01L 1/18* (2013.01); *G01L 5/225* (2013.01);
  (Continued)

(58) Field of Classification Search
  CPC ............. G01L 5/225; G05G 1/42; G05G 1/50
  See application file for complete search history.

(56) References Cited

U.S. PATENT DOCUMENTS 6,367,886 B1   4/2002  Shaw
6,634,221 B2  10/2003  Harris et al.
(Continued)

FOREIGN PATENT DOCUMENTS

DE   102013106654 A      1/2015
DE   102014103167 A1 *   9/2015   ............. B60K 26/02
(Continued)

OTHER PUBLICATIONS

RACELOGIC: "Brake Pedal Force Sensor," (RLACS282); https://en.racelogic.support/VBOX_Automotive/Product_Info/Sensors/Brake_Pedal_Force_Sensor; updated Aug. 29, 2019, 3 pgs.
(Continued)

*Primary Examiner* — Vicky A Johnson
(74) *Attorney, Agent, or Firm* — Dinsmore & Shohl LLP

(57) ABSTRACT

A pedal assembly includes a housing having a cavity. A pedal arm is at least partially received in the cavity. The pedal arm is configured to move within the cavity relative to the housing. At least two pivot levers are positioned within the cavity and configured to pivot upon a contact by the pedal arm. A spring retainer is formed in the housing. The spring retainer has a spring positioned therein. A spring member is disposed about the spring retainer and is moveable about the spring retainer. At least two sensors are attached to the spring housing. At least two sensor assemblies are positioned in the housing and configured to sense an amount of travel of the at least two sensors. When a load is applied to the pedal pad, the pedal arm contacts the at least two pivot members pivoting the pivot members and moving the spring housing wherein the sensors movement is sensed by the respective at least two sensor assemblies indicative of the amount of depression of the pedal pad.

16 Claims, 6 Drawing Sheets

(51) Int. Cl.
    *G01L 1/18*    (2006.01)
    *G01L 5/22*    (2006.01)
    *G05G 1/42*    (2008.04)
    *G01L 1/22*    (2006.01)
    *G05G 1/44*    (2008.04)
    *G05G 1/50*    (2008.04)
    *G05G 5/05*    (2006.01)

(52) U.S. Cl.
    CPC .............. *G05G 1/42* (2013.01); *G01L 1/2206* (2013.01); *G05G 1/44* (2013.01); *G05G 1/50* (2013.01); *G05G 5/05* (2013.01)

(56) References Cited

U.S. PATENT DOCUMENTS

| | | | |
|---|---|---|---|
| 7,066,049 B2 * | 6/2006 | Reimann | B60K 26/02 74/513 |
| 7,219,966 B2 | 5/2007 | Young | |
| 9,079,570 B2 | 7/2015 | Sellinger et al. | |
| 10,401,896 B1 | 9/2019 | Kim et al. | |
| 10,579,089 B2 | 3/2020 | Adoline et al. | |
| 2005/0082909 A1 | 4/2005 | Constantakis et al. | |
| 2007/0193401 A1 * | 8/2007 | Campbell | B60K 26/02 74/560 |
| 2008/0314192 A1 | 12/2008 | Willemsen et al. | |
| 2017/0217524 A1 | 8/2017 | Yang | |
| 2020/0001711 A1 | 1/2020 | Burke et al. | |

FOREIGN PATENT DOCUMENTS

| | | |
|---|---|---|
| DE | 102015200670 B3 | 2/2016 |
| KR | 1020210130296 A | 11/2021 |
| WO | 2005026861 A2 | 3/2005 |
| WO | 2016186979 A1 | 11/2016 |

OTHER PUBLICATIONS

TEKSCAN: "Force Sensitive Video Game Brake Pedals," https://www.tekscan.com/applications/force-sensitive-video-game-brake-pedals; updated Dec. 14, 2022, 2 pgs.

Althen Sensors & Controls: "ALF304 Brake Pedal Force Sensor," https://www.althensensors.com/sensors/force-sensors/special-automotive-force-sensors/5542/alf304-brake-pedal-force-sensor/; updated Dec. 14, 2022, 7 pgs.

* cited by examiner

PEDAL ASSEMBLY HAVING FORCE SENSING

CROSS-REFERENCE TO RELATED APPLICATIONS

This utility patent application claims priority benefit from U.S. Provisional Patent Application Ser. No. 63/309,817, filed Feb. 14, 2022 and entitled "Pedal Pad Force Sensors", the entire contents of which is incorporated herein in its entirety.

TECHNICAL FIELD

The present specification generally relates to pedal assemblies for vehicles and, more specifically, to force sensing pedal assemblies.

BACKGROUND

Conventional pedal assemblies include a pedal arm that is pivotally coupled to a housing at one end and a pedal pad positioned on an opposite end. In these pedal assemblies, various inductive or Hall Effect type sensors are positioned within the housing to measure the amount of pivot of the pedal arm with respect to the a target. When a force is applied to the pedal pad, the pedal arm pivots and, based on the amount of pivot, generally electric motors control the vehicle accordingly. However, in floor mounted pedal pads, a user may not apply the same pressure or load over the entire pedal pad. As such, load balancing and measuring small amount of travel of the pedal arm are issues.

SUMMARY

In one embodiment, a pedal assembly includes a housing having a cavity. A pedal arm is at least partially received in the cavity. The pedal arm is configured to move within the cavity relative to the housing. At least two pivot levers are positioned within the cavity and configured to pivot upon a contact by the pedal arm. A spring retainer is formed in the housing. The spring retainer has a spring positioned therein. A spring member is disposed about the spring retainer and is moveable about the spring retainer. At least two sensors are attached to the spring housing. At least two sensor assemblies are positioned in the housing and configured to sense an amount of travel of the at least two sensors. When a load is applied to the pedal pad, the pedal arm contacts the at least two pivot members pivoting the pivot members and moving the spring housing wherein the sensors movement is sensed by the respective at least two sensor assemblies indicative of the amount of depression of the pedal pad.

In another embodiment, a pedal assembly includes a housing having a cavity. A pedal arm is at least partially received in the cavity. The pedal arm is configured to move within the cavity relative to the housing. Three pivot levers are positioned within the cavity and configured to pivot upon a contact by the pedal arm. A spring retainer is formed in the housing. The spring retainer has a spring positioned therein. A spring member is disposed about the spring retainer and is moveable about the spring retainer. Three sensors are attached to the spring housing. Three sensor assemblies are positioned in the housing and configured to sense an amount of travel of the three two sensors. When a load is applied to the pedal pad, the pedal arm contacts the three pivot members pivoting the pivot members and moving the spring housing wherein the three sensors movement is sensed by the respective three sensor assemblies indicative of the amount of depression of the pedal pad.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to a pedal assembly that includes a pedal arm movably positioned within a cavity of a housing. A proximal end of the pedal arm includes a pedal pad. Three pivot members are positioned within the cavity and each are configured to deflect upon a contact by a distal end of the pedal arm when a load is applied to the pedal pad. Various embodiments of the pedal assembly are described in detail herein.

As used herein, the term "communicatively coupled" means that coupled components are capable of exchanging data signals with one another such as, for example, electrical signals via conductive medium or a non-conductive medium, though networks such as via Wi-Fi, Bluetooth, and the like, electromagnetic signals via air, optical signals via optical waveguides, and the like.

As used herein "minimal travel" or "reduced travel" or "limited travel" may be interchangeability used and refer to a pedal stroke of the pedal arm needed or required to detect the amount of load or force of the load applied to the pedal pad. In minimal travel pedal applications, the total travel of the pedal arm is 30 millimeters or less. As such, sensing the amount of travel of the pedal arm in these minimal travel applications for brake-by-wire applications must be precise due to the limited amount of pedal stroke. Load balancing of the pedal arm is desirable to detect a load applied to any portion of the pedal pad without the need for a direct center contact of the pedal pad. As such, the aspects of the pedal assemblies described herein are directed to minimal travel pedal assemblies with load balancing and strain gauge sensing that is more sensitive to the load applied to the pedal pad and is immune to load offset to sense any movement of the pedal arm regardless of where the load is applied to on the pedal pad.

Figure 1:
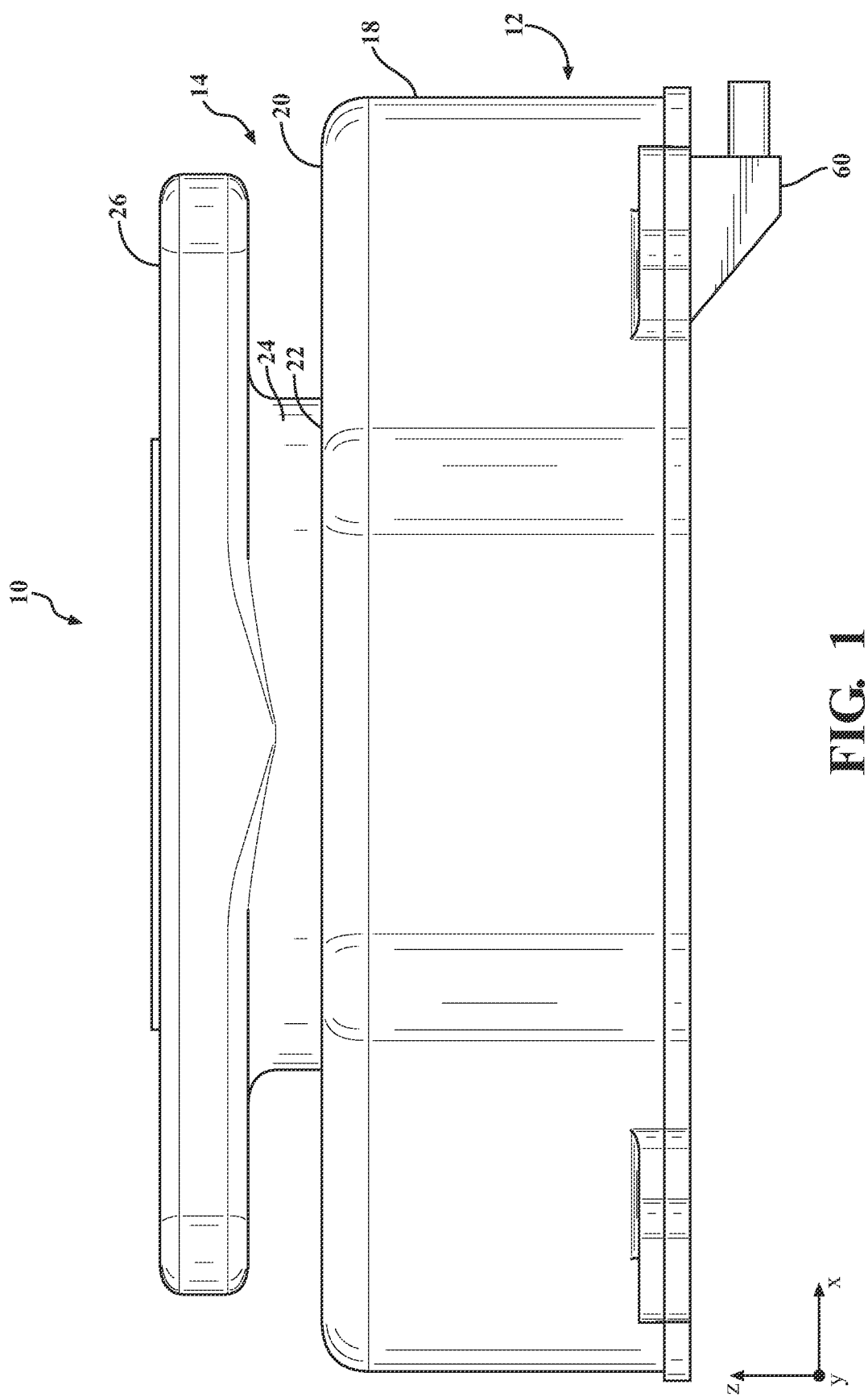
FIG. 1 depicts a front view of a pedal assembly according to one or more embodiments shown and described herein.

As used herein, the term "longitudinal direction" refers to the forward-rearward direction of the pedal assembly (i.e., in the +/−X-direction depicted in FIG. 1). The term "lateral direction" refers to the cross-pedal assembly direction (i.e., in the +/−Y-direction depicted in FIG. 1), and is transverse to the longitudinal direction. The term "vertical direction" or "up" or "above" or "below" refer to the upward-downward direction of the pedal assembly (i.e., in the +/−Z-direction depicted in FIG. 1).

Referring initially to FIGS. 1-4, a pedal assembly 10 is depicted. The pedal assembly 10 includes a housing 12, and a pedal arm assembly 14. The housing 12 includes a lower surface member 16 and an upwardly extending side wall 18 that terminates at a top surface 20. The top surface 20 includes an opening 22 formed therein allowing passage of a portion of the pedal arm assembly 14.

The pedal arm assembly 14 includes a pedal arm 24 which includes a pedal pad 26 portion that extends to a contact end 28. In some embodiments, the pedal pad 26 is generally rectangular shaped. The contact end 28 may be circular in shape to engage with pivot levers 34, as will be discussed in more detail below. It should be realized that various shaped pedal pads 26 and contact ends 28 may be utilized other that those shown in the depicted embodiment. In one aspect, the pedal pad 26 engages a foot of a user and can depress against to brake, accelerate, and/or activate a clutch control.

Figure 2A:
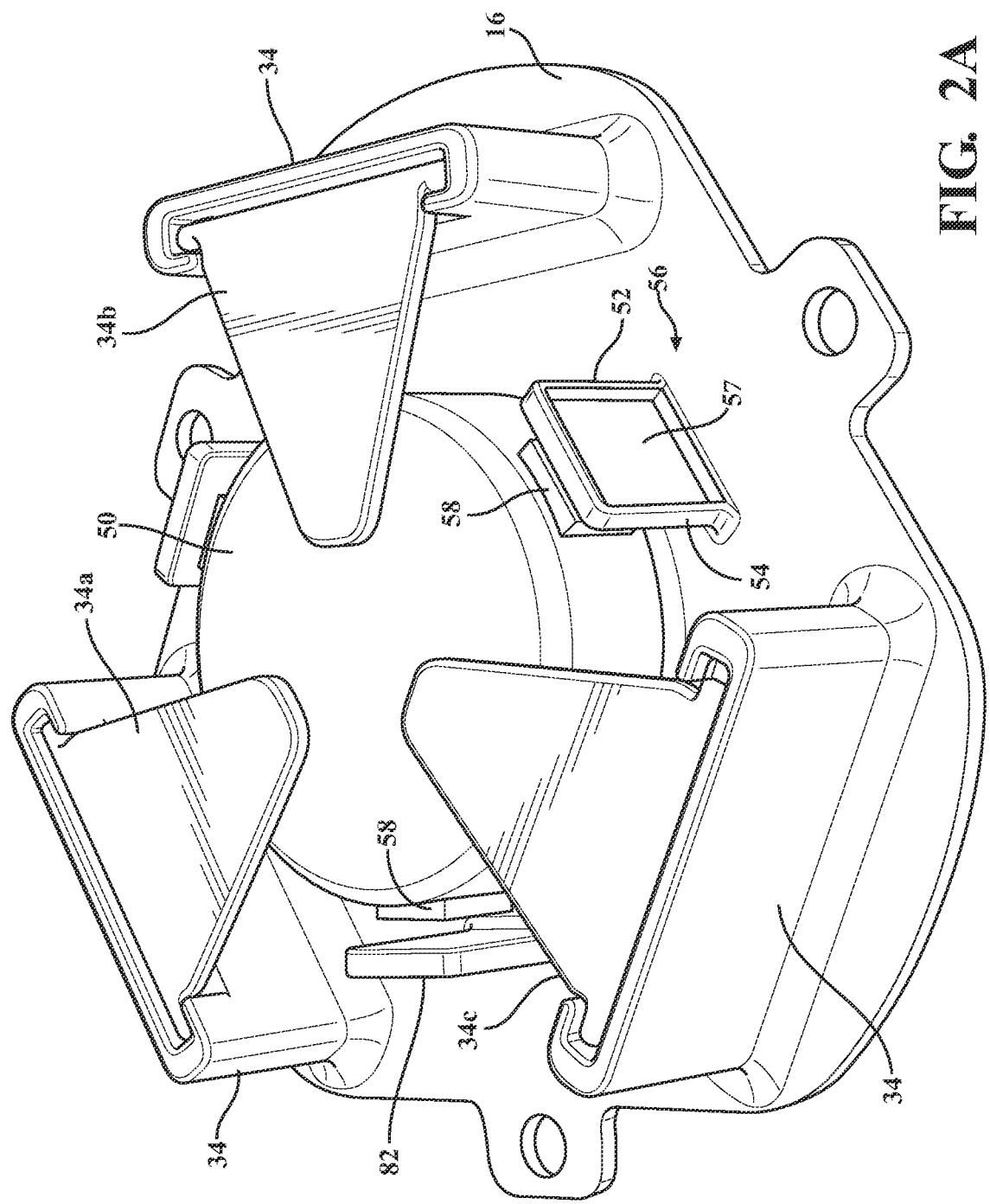
FIG. 2A depicts a perspective top and side view of the pedal assembly of FIG. 1 with the housing removed and the lever arms in an un-flexed position according to one or more embodiments shown and described herein.
Figure 2B:
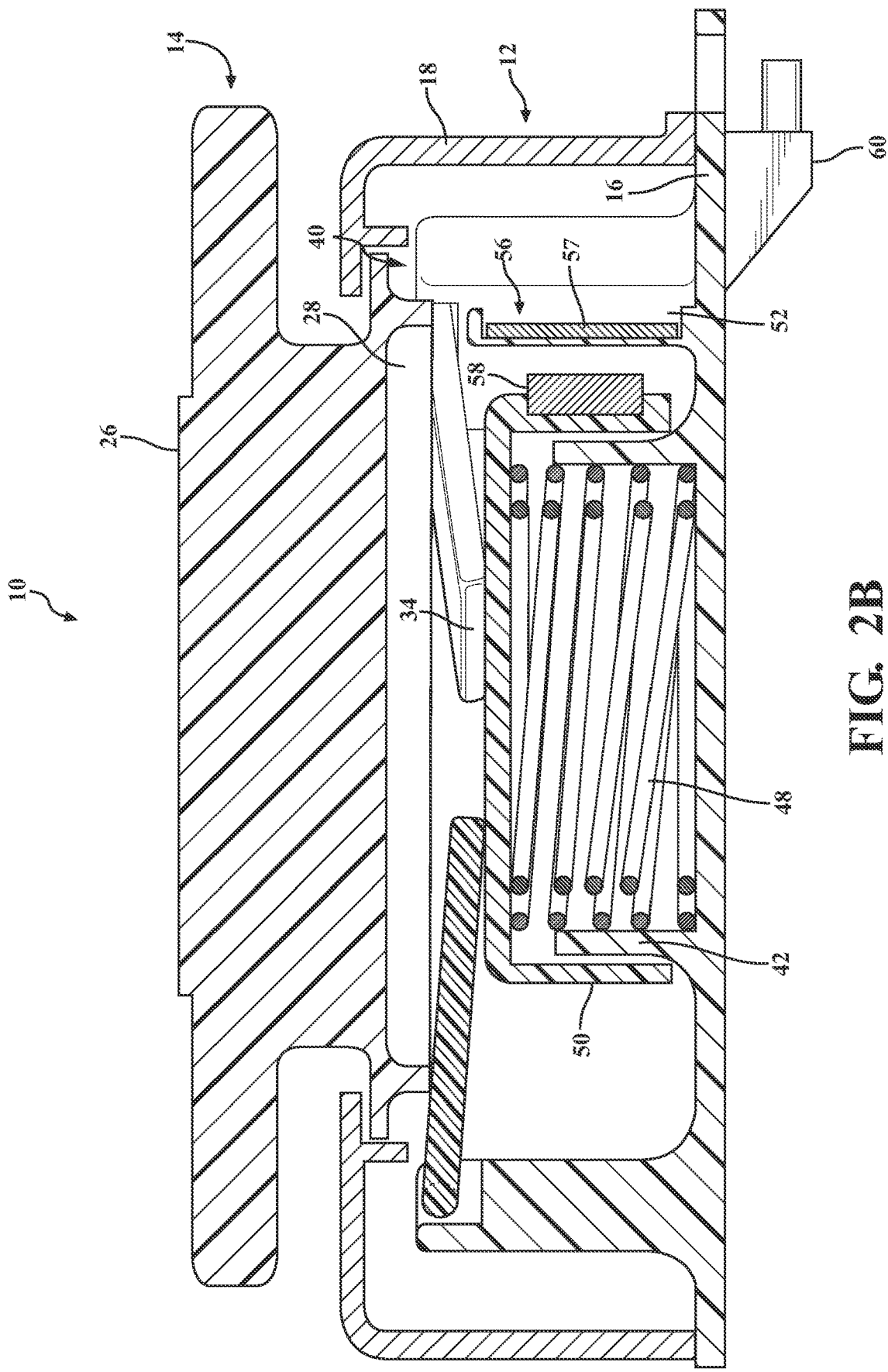
FIG. 2B depicts a side sectional view of the pedal assembly of FIG. 1 with the lever arms in a flexed position according to one or more embodiments shown and described herein.
Figure 3:
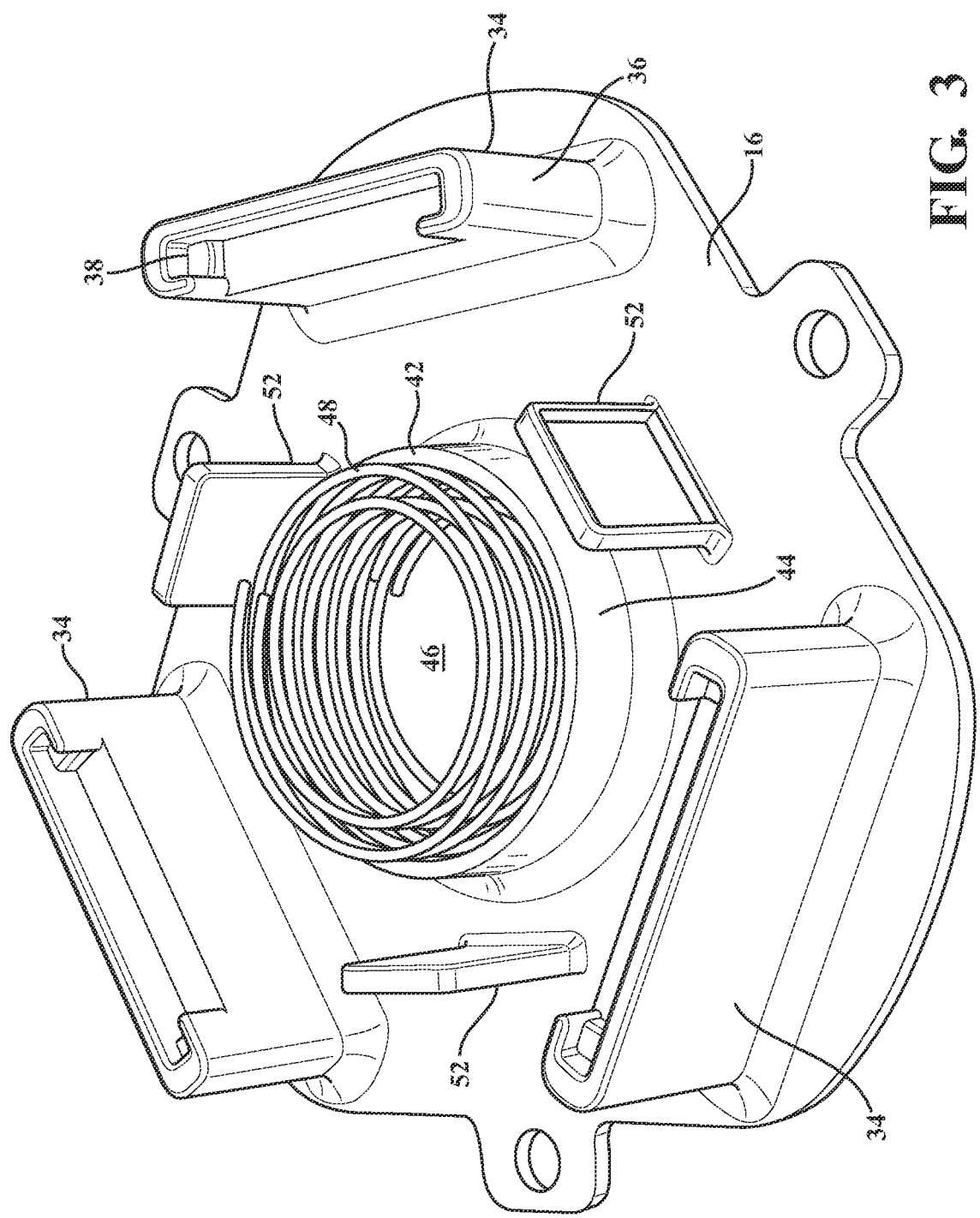
FIG. 3 depicts a perspective top and side view of the pedal assembly of FIG. 1 with the housing and spring cup removed according to one or more embodiments shown and described herein.
Figure 4:
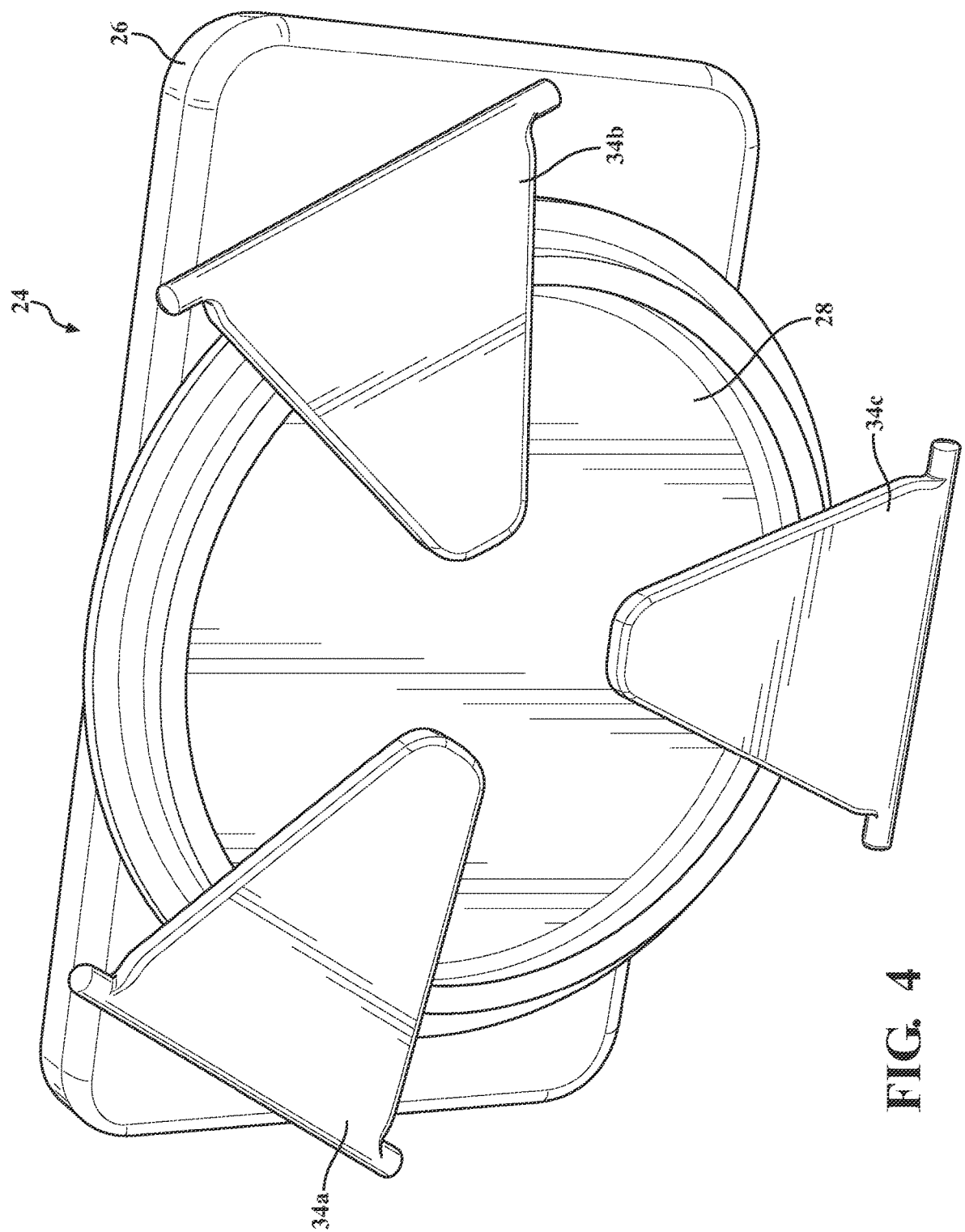
FIG. 4 depicts a perspective bottom view of pedal pad and lever arms according to one or more embodiments shown and described herein.

Referring to FIGS. 2A and 3, the housing 12 includes a lower surface member 16. The lower surface member 16 includes at least two upwardly extending pivot members 34 with three being shown in the depicted embodiment. The pivot members 34 include an upwardly extending wall 36 that terminates at a notch 38. Each notch 38 receives a pivot lever 34. The pivot lever 34 is retained in the notch 38 and is movable pivotally upward and downward as will be discussed in more detail below.

The housing 12 may be formed of a molded plastic. For example, the housing 12 may be formed with various materials such as acrylonitrile butadiene styrene (ABS), polyethylene (PE), polypropylene (PP), polycarbonate (PC), nylon, polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, thermoplastic vulcanizate, polysulfone, combinations thereof, and/or the like. Additionally, additives may be added such as UV absorbers, flame retardants, colorants, glass fibers, plasticizers and/or the like.

The housing 12 may be floor mounted. That is, in some embodiments, the housing 12 may be coupled or mounted to be positioned within or extending from a floor surface of a vehicle. As such, the cavity 40 of the housing accommodates the pedal arm 14 at full depression to allow the pedal pad 26 to fully travel.

The lower surface member 16 includes a spring retainer 42 formed therein. The spring retainer 42 includes an upwardly extending wall 44 having a central cavity 46 defined by the wall 44. The central cavity 46 receives a spring 48. A spring housing 50 is disposed about the spring retainer 42 and is moveable about the spring retainer 42. The spring 48 biases the spring housing 50 upwardly when not force is applied to the pedal pad 26.

The lower surface member 32 includes at least two sensor housings 52 formed thereon, with three being shown in the depicted embodiment. Each sensor housing 52 includes a sensor wall 54 that extends upwardly from the lower surface member 32. A sensor assembly 56 is retained in the sensor housing 52. The spring housing 50 includes at least two couplers 58 formed thereon corresponding to at least two inductive sensors 57 of the sensor assembly 56, with three shown in the depicted embodiment.

The sensor assembly 56 including the inductive sensor 57 detects movement of the coupler 58 attached to the spring housing 50 using inductive sensing technology. In some embodiments, the sensor assembly 56 includes a printed wiring assembly and a connector housing 60. The printed wiring assembly may include a circuit board (or a printed circuit board), which may include at least one Asic 62. The coupler 58 may be mounted or attached to the spring housing 50 such that the coupler may be positioned adjacent to the Asic 62. The Asic 62 may detect movement of the coupler 58 to provide a signal.

Figure 5:
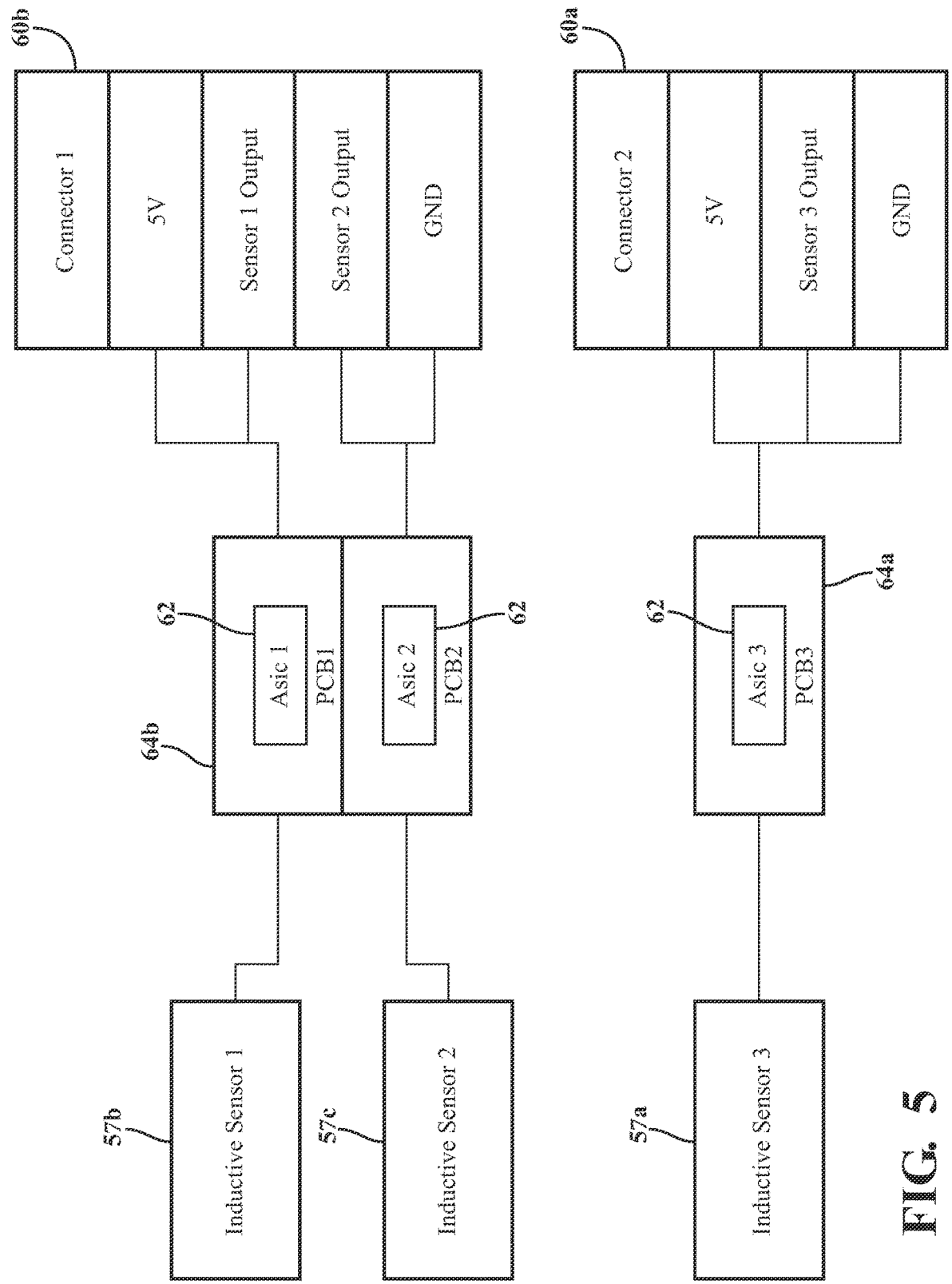
FIG. 5 schematically depicts a block diagram of the circuit board schematic of the pedal assembly of FIG. 1 according to one or more embodiments shown and described herein.

Now referring to FIG. 5, a block diagram of the circuit board schematic of the pedal assembly 10 is schematically depicted. As depicted, two of the inductive sensors 57b, 57c are communicatively coupled to the circuit board 64b while the inductive sensor 57a is communicatively coupled to the circuit board 64a. The circuit board 64b is communicatively coupled to the connector 60b while the circuit board 64a is communicatively coupled to the connector 60a. As such, data communication between the inductive sensors 57a, 57b, 57c to the electronic control unit on the vehicle side is established via the connectors 60a, 60b. Further, such an arrangement permits for a redundancy in sensing any load applied to anywhere on the pedal pad 26 and provides a desirable fail-safe should any of the inductive sensors 57a, 57b, 57c and/or circuit boards 64a, 64b or components thereof fail.

In one aspect, the sensors output a digital signal to the connector 60a, for example, indicative of the current amount of travel of the coupler 58. As such, each of the pivot members 34a, 34b, 34c provide a load balancing to the pedal arm 24. That is, each of the pivot members 34a, 34b, 34c are configured to independently balance the weight of the pedal pad 26 and pedal arm 24 and to contact the spring housing 50 in response to a load applied to any portion of the pedal pad 26, which in turn is sensed by the respective inductive sensors 57a, 57b, 57c indicative of the amount of the load applied to the pedal pad 26. As such, the pivot members 34 and the corresponding inductive sensors 54 provide an improvement over conventional systems by providing a precise measurement to any load applied to any portion of the pedal pad 26. That is, the user does not have to center contact with the pedal pad 26 and the load may be applied to any portion of the pedal pad 26. Further, the arrangement of the inductive sensors 57 provide a precise sensing in applications where the pedal pad 26 and pedal arm 24 have a minimal travel.

Further, each of the corresponding inductive sensors 57a, 57b, 57c provide a redundancy in sensing capabilities. As depicted in FIG. 5, two of the inductive sensors 57b, 57c are communicatively coupled to the circuit board 60b while the inductive sensor 5'7a is communicatively coupled to the circuit board 60a, Such an arrangement permits for a redundancy in sensing any load applied to anywhere on the pedal pad 26 and provides a desirable fail-safe should any of the inductive sensors 57a, 57b, 57c and/or circuit boards 60a, 60b or components thereof fail.

In operation, when the pedal pad 26 is depressed the pedal arm 24 moves and the contact end 28 of the pedal arm 24 engages and pivots the pivot levers 34 in a direction towards the spring housing 50. The pivotal movement of the pivot levers 34 causes the spring housing 50 to move downwards against the biasing force of the spring 48 to generate a force feedback to a foot on the pedal pad 26. The spring housing 50 including the inductive sensors 57 formed thereon moves downward and such movement is detected by the sensor assembly 56 as described above.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A pedal assembly comprising:
a housing having a cavity;
a pedal arm at least partially received in the cavity, the pedal arm configured to move within the cavity relative to the housing;
at least two spaced apart pivot levers positioned within the cavity and configured to pivot upon a contact by the pedal arm;
a spring retainer formed in the housing, the spring retainer having a spring positioned therein;
a spring member disposed about the spring retainer and moveable about the spring retainer;
at least two sensors attached to the housing;
at least two sensor assemblies positioned in the housing and configured to sense an amount of travel of the at least two sensors;
wherein when a load is applied to a pedal pad, the pedal arm contacts the at least two spaced apart pivot levers pivoting the at least two spaced apart pivot levers and moving the housing wherein the sensors movement is sensed by the respective at least two sensor assemblies indicative of an amount of depression of the pedal pad.

2. The pedal assembly of claim 1, wherein the housing includes a lower surface member and an upwardly extending side wall that terminates at a top surface, the top surface includes an opening formed therein allowing passage of a portion of the pedal arm.

3. The pedal assembly of claim 1 including at least two upwardly extending pivot members formed in the housing, the at least two upwardly extending pivot members retaining the respective at least two spaced apart pivot levers.

4. The pedal assembly of claim 1, wherein the at least two spaced apart pivot levers is three spaced apart pivot levers arranged to distribute the load applied by the pedal pad to the housing.

5. The pedal assembly of claim 1 including at least two upwardly extending sensor housings retaining the at least two sensor assemblies.

6. The pedal assembly of claim 1 wherein the at least two sensors attached to the housing are inductive sensors.

7. The pedal assembly of claim 1 wherein the at least two sensor assemblies positioned in the housing are inductive sensor assemblies.

8. The pedal assembly of claim 1, wherein the at least two sensor assemblies positioned in the housing are three sensor assemblies.

9. The pedal assembly of claim 1, wherein the at least two sensors attached to the housing are three sensors.

10. The pedal assembly of claim 1, wherein the housing is mounted to a floor.

11. A pedal assembly comprising:
a housing having a cavity;
a pedal arm at least partially received in the cavity, the pedal arm configured to move within the cavity relative to the housing;
three pivot levers positioned within the cavity and configured to pivot upon a contact by the pedal arm;
a spring retainer formed in the housing, the spring retainer having a spring positioned therein;
a spring member disposed about the spring retainer and moveable about the spring retainer;
three sensors attached to the housing;
three sensor assemblies positioned in the housing and configured to sense an amount of travel of the three sensors;
wherein when a load is applied to a pedal pad, the pedal arm contacts the three pivot levers pivoting the three pivot levers and moving the housing wherein the sensors movement is sensed by the respective three sensor assemblies indicative of an amount of depression of the pedal pad.

12. The pedal assembly of claim 11, wherein the housing includes a lower surface member and an upwardly extending side wall that terminates at a top surface, the top surface includes an opening formed therein allowing passage of a portion of the pedal arm.

13. The pedal assembly of claim 11 including three upwardly extending pivot members formed in the housing, the three upwardly extending pivot members retaining the three pivot levers.

14. The pedal assembly of claim 11 including three upwardly extending sensor housings retaining the three sensor assemblies.

15. The pedal assembly of claim 11 wherein the three sensors attached to the housing are inductive sensors.

16. The pedal assembly of claim 11 wherein the three sensor assemblies positioned in the housing are inductive sensor assemblies.

* * * * *

UNITED STATES PATENT AND TRADEMARK OFFICE
CERTIFICATE OF CORRECTION

PATENT NO. : 11,953,931 B2
APPLICATION NO. : 18/107716
DATED : April 9, 2024
INVENTOR(S) : Marty Vanek and James Hartford Page 1 of 1

It is certified that error appears in the above-identified patent and that said Letters Patent is hereby corrected as shown below:

On the Title Page

Item (72), inventor 2, address, delete "Bleinheim" and insert --Blenheim--, therefor.

In the Specification

In Column 1, Line(s) 26, after "respect to", delete "the", therefor.

In Column 2, Line(s) 53, delete "though" and insert --through--, therefor.

In Column 2, Line(s) 57, delete "interchangeability" and insert --interchangeably--, therefor.

In Column 3, Line(s) 29, after "other", delete "that" and insert --than--, therefor.

In Column 3, Line(s) 66, after "upwardly when", delete "not" and insert --no--, therefor.

In Column 4, Line(s) 63, after "60$a$", delete "," and insert --.--, therefor.

Signed and Sealed this
Twenty-second Day of July, 2025

Coke Morgan Stewart
*Acting Director of the United States Patent and Trademark Office*